Figure 1:
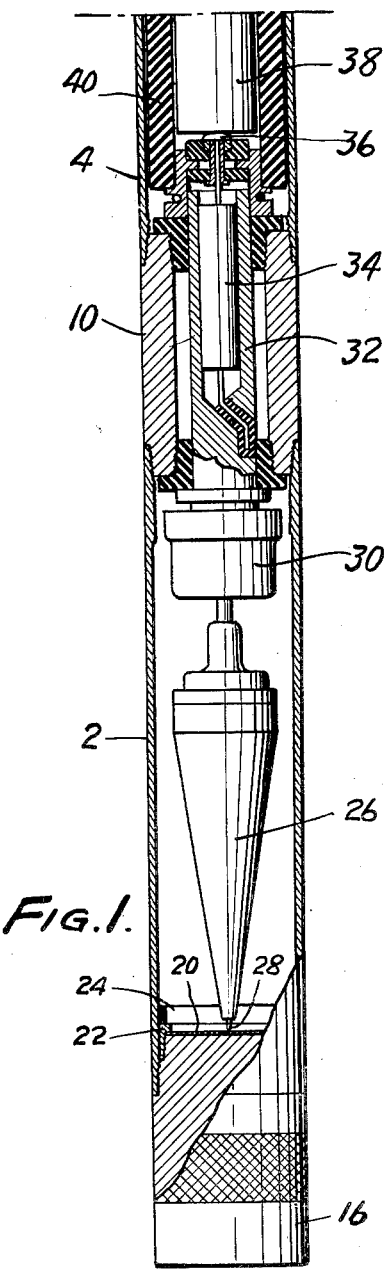

Oct. 14, 1952   R. RING   2,613,448
WELL SURVEYING INSTRUMENT
Filed March 20, 1946

WITNESS:
Robt. R. Kitchel.

INVENTOR
Roland Ring
BY
Besser & Harding
ATTORNEYS.

Patented Oct. 14, 1952

2,613,448

UNITED STATES PATENT OFFICE 2,613,448

WELL SURVEYING INSTRUMENT

Roland Ring, Houston, Tex., assignor to Sperry-Sun Well Surveying Company, Philadelphia, Pa., a corporation of Delaware Application March 20, 1946, Serial No. 655,683

2 Claims. (Cl. 33—205.5)

This invention relates to a well surveying instrument, and has particular reference to the surveying of bore holes by the so-called go-devil method.

In the patent to Roland Ring 2,246,319, dated June 17, 1941, and in an application of said Roland Ring Serial No. 379,835, filed February 20, 1941, there are described an instrument and methods of operating the same, which instrument is characterized by a slow and continuous marking action, specifically electrolytic in character, whereby a record of the position of the instrument within a bore hole is made only when the instrument remains stationary for an extended period of time. For a better understanding of the nature of the present invention, which is not, however, limited for its application to said instrument of the above mentioned patent and application, the operation of said Ring instrument may be described as follows:

If the instrument is run into a bore hole, either within a drill stem or in an open hole by means of a wire line or cable, the movements of the instrument incidental to its descent into the hole cause a pendulum to move about relative to a record member, so that even though current is continuously flowing from the pendulum to the record member, no point of the record member is exposed to the current action for a sufficiently long time to receive a definite marking. When the instrument reaches the level at which a record of inclination is to be made, it is brought to rest and held in such position for a period of upwards of about one minute, with the result that the electrolytic action is concentrated at one point of the record member and an easily distinguishable spot is made thereon. If it is then desired to make one or more additional records at other levels, the instrument is moved to these successive levels and permitted to remain at them for different periods of time, with the result that marks differing in intensity and/or size are produced which, by their nature, can be identified with the particular levels through a knowledge of the relative times during which the instrument was stationary. Following the completion of the record or records, the instrument is then withdrawn continuously from the hole and in this withdrawing movement, as well as in the periods of movement between the successive recordings, the pendulum will swing relative to the record member so that again no obliterating markings are produced.

In the case of operation of the above type, the instrument is perfectly satisfactory and requires no timing means whatever. However, a common practice in the making of records with other types of surveying instruments involves their being dropped freely through a drill stem so that they come to rest in a position adjacent the bit. During this location in a position of rest, a record is made under the control of suitable timing means and the instrument is then recovered when the bit is brought to the surface, for example for the purpose of changing the bit or checking its condition.

In the use of said Ring instrument in go-devil fashion, the motion of the instrument through the drill stem prevents the making of any record during its fall, and a record is then made by holding the drill stem stationary for a sufficient period of time while the instrument rests adjacent the bit. If the drill stem was then raised and dismantled by continuous work of the drilling crew, the instrument would be subject to sufficiently continuous agitation, with only quite limited periods of rest, so that no record-obliterating markings would be produced on the record member. However, it is not usual for a derrick crew to work continuously in removing a drill stem from deep holes, and generally speaking, workmen, after raising the drill stem part way, will take a short period of rest before proceeding further. If an instrument of the Ring type is in the drill stem during such a period of rest, or any other period of stationary condition of the drill stem, it will be obvious that another record will be made which might be indistinguishable from the desired record unless a substantially different time of rest is involved, and even then in some rare instances, particularly where the hole is substantially straight, the two records may overlap so that the significance of the original one is lost. It is generally not desirable to rotate the drill stem during such a period of interruption of its withdrawal, and consequently, such rotation is not a practical solution to the problem.

The present invention relates to the provision of means for terminating the recording action of a recording instrument of the Ring or other type at a desired time. Specifically, this is accomplished through the use of inertia means set into operation when the instrument, falling as a go-devil, reaches its position of rest in a drill stem.

Figure 2:
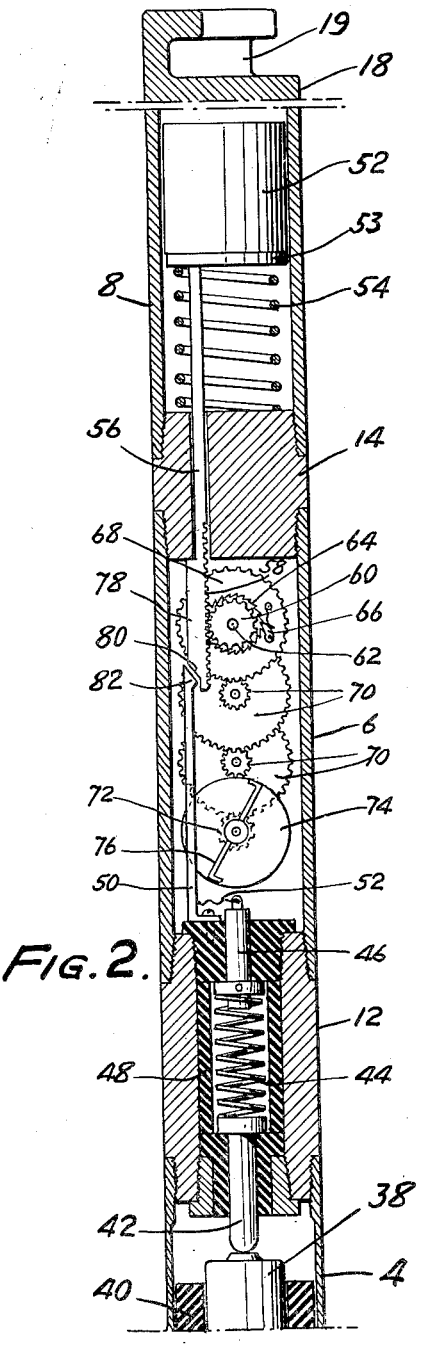

This and other objects of the invention, particularly relating to details, will become apparent from the following description, read in conjunction with the accompanying drawings, in which:

Figure 1 is a longitudinal sectional view through the lower portion of a well surveying instrument embodying the invention; and Figure 2 is a similar sectional view through the upper portion of the same instrument.

The instrument illustrated in the drawings is basically of the type disclosed in said Ring application, and comprises an inner casing adapted to be located in a fluid-tight protective casing in use. The inner casing comprises tubes 2, 4, 6, and 8 joined by coupling members 10, 12, and 14. Threaded into the bottom of the tube 2 is a plug 16 on which may be secured the record member 20 by means of a threaded ring 22, though the record member may be secured in the plug, for example, by depression within a flanged portion thereof. This record member, as described in detail in said Ring patent and application, preferably comprises a sheet of paper containing a colored material such as a colored metallic ferrocyanide which, upon the passage of an electrical current while it is moist, will be marked with a white spot by reason of the formation of alkali at a cathode provided by a metallic point 28 slidable within a pendulum 26 mounted for universal pivotal movement in a bearing arrangement 30. An insulating ring 24 prevents short circuiting by preventing contact of the pendulum with the metallic wall of the tube 2.

The bearing 30 is mounted at the lower end of a cylindrical pin 32 which extends through an opening in the coupling member 10 and is insulated therefrom as indicated. Within a bore in pin 32 is a resistor 34, the lower lead of which is soldered within an opening in the member 32 while the upper lead of this resistor is electrically connected to a contact button 36, insulated from the tube 32 and adjacent metallic parts, on which button may rest the bottom of the lowermost of a group of batteries 38 arranged in series in flashlight fashion and held within an insulating tube 40. Contact with the positive pole of the uppermost battery is made by means of a metallic pin 42 urged downwardly by a spring 44 which, in turn, makes electrical contact with a pin 46. The pin 42, spring 44, and pin 46 are mounted in an insulating insert arrangement 48 within the coupling member 12.

The instrument, to the extent so far described, is essentially the Ring instrument of said patent and application. The upper end of the instrument is closed by a plug 18 threaded into the upper end of the tube 8 and provided with a slotted opening 19 which is adapted to be secured to a cooperating element in the protective casing. In the Ring instrument, a plunger corresponding to the pin 46 is arranged to make contact with the cooperating element in the protective casing just mentioned, thereby completing the electrical circuit through the pendulum, resistor 34, and the batteries, to the ground, provided by the casing of the instrument.

In accordance with the present invention, there is located above the coupling member 12 elements constituting a timing means having as its function the opening of the electrical circuit through the pendulum after a predetermined period elapses following the location of the instrument in recording position.

For this purpose the pin 46 is electrically connected by a wire 52 with a spring contact member 50 which is secured to an uppermost element of the insulating assembly 48. Within the tube 8 there is provided a weight 52 which may be considerably more elongated than illustrated in the drawing and which may be of substantial mass. This weight 52 rests upon a platform 53 which is urged upwardly by a spring 54 of sufficient strength to support the platform and weight, but, nevertheless, having a quite substantial deflection under inertial action of the weight as will be pointed out hereafter. Extending downwardly from the platform 53 through an opening in the coupling 14 is a rod 56, the lower end of which takes the form of a rack 58 adapted to mesh with a pinion 60 to which is joined a ratchet wheel 64, both being loosely mounted upon a transverse pin 62.

Also mounted on the pin 62 is a gear 68 which carries a pawl 66, spring pressed so as to be maintained in engagement with the teeth of the ratchet wheel 64. The gear 68 through a train of pinions and gears generally indicated at 70 is arranged to drive a final pinion 72 which is secured to a disc 74 carrying a fly member 76 providing vanes to which air will offer substantial resistance when rapid rotation of the vanes takes place. As will be evident from the figure, the gear ratio increases through the series of pinions so that a very large number of revolutions of the fly member 76 will correspond to a single revolution of the gear 68.

In the operation of the instrument, after it is assembled as indicated in the figures, it may be located in its protective casing, whereupon it is ready to be dropped within a drill stem for the making of one or more records. The preparation of the record disc 20 by moistening is carried out in the usual fashion as indicated in said Ring patent and application.

Prior to the lowering of the instrument, the circuit through the pendulum 26 will be open, though this at such time is relatively immaterial inasmuch as recording will be prevented either by the movements involved in handling the instrument or by the inversion of the instrument, which last condition will cause the pin 28 to drop within the pendulum 26 out of contact with the recording disc.

As the instrument is dropped within the drill stem, it is likewise immaterial whether the circuit through the pendulum is open or closed. If the circuit is closed, the motions of the pendulum will prevent any point of the record member from being exposed to electrolytic action for a sufficiently long time to permit any marking to occur, the electrolytic action being quite slow, and no substantial marking taking place unless the pin 28 remains in contact with a particular point on the record member for an extended period of time, for example, of the order of at least thirty seconds.

For simplicity, it may be first considered that during the dropping of the instrument within the drill stem, it does not encounter any obstructions causing any such retardation of its motion as will cause the spring 54 to yield to permit contact between the enlarged portion 78 of the plunger 56 and the contact point 82 of the spring member 50, the plunger 78 being cut away as indicated at 80 so that such contact is prevented so long as the spring 54 holds the weight 52 in its uppermost position.

When the instrument reaches the bottom of the drill stem, however, it will be suddenly arrested with the result that the weight 52 continuing to move downwardly by reason of its inertia will substantially compress the spring 54, driving downwardly the plunger 56. As the plunger moves downwardly, it will encounter the spring contact member 50 by which, if it is not already in mesh with the pinion 60, the rack 58 will be caused to mesh with the pinion and rotate it and its ratchet 64 in a counter-clockwise direction. As such rotation occurs, the ratchet teeth will freely pass the pawl 66.

When the weight 52, however, reaches the lowermost limit of its movement and the spring 54 thereafter urges it upwardly, it is not free to move upwardly since now the rack 58 will be held in tight mesh with the pinion 60 so that upward movement cannot occur without rotation of the pinion 60 which must be accompanied by drive of the pawl 66 by the ratchet wheel 64 and through the pawl, the rotation of the gear train and the fly member 76. The clockwork mechanism is thus, in effect, wound up and the action of the spring 54 thereafter is to raise the weight 52 slowly as determined by the speed of the fly member 76 limited by the resistance of the air. As a consequence, the enlargement 78 of the plunger 56 moves quite slowly upwardly relative to the spring contact member 82 which, as will be evident from the construction, will, during such action, effect closure of the circuit through the pendulum. The instrument is thus placed in condition for recording.

At this time, the instrument will rest at the bottom of the drill stem and as soon as the swinging motion of the pendulum 26 is sufficiently damped to bring it to rest, the making of a record will begin. From this point on, the recording operation is essentially identical with what is described in said patent and application, i. e., either a single record may be made or a plurality of records may be made by causing the drill stem to rest at different levels for predetermined different periods of time to secure records distinguishable from each other by either the intensity or diameter of the markings which are produced.

The timing mechanism is so constructed as to give an elapsed time during which recording can take place desirable for the particular operations required. If, for example, a single record alone is to be made, it is only necessary that a period of about three minutes should elapse before the weight 52 is brought by the spring 54 to its uppermost position with a resulting opening of the contact between the enlargement 78 of the plunger 56 and the spring member 82. On the other hand, if a plurality of records is to be made, the timing action may be extended to ten minutes or more. This is, of course, subject to choice and depends solely on the relative ratio of the gear train, the mass of the weight 52, and the strength of the spring 54. If a long period is desired prior to interruption of the circuit, a conventional escapement may be substituted for the fly member 76. In general precise timing is quite unnecessary, a large error in the period being quite permissible. Consequently, the clockwork mechanism may be relatively crude through sturdy and positive in action.

When the predetermined period elapses, the circuit is open and from that time on, it is immaterial whether the instrument is in motion or stationary, since even if it is stationary, no recording action can take place. Thus, after the time determined by the operation just mentioned has elapsed, it is quite permissible for the withdrawal of the drill stem or motion thereof to be interrupted without occasioning the loss or obliteration of the record.

It may be noted that a possible arresting shock imparted to the instrument during its lowering does not interfere with the action which has been described. If, for example, during the lowering the instrument violently strikes a joint in the drill stem or some other obstruction from which, however, it later glances off, to continue its downward motion, the arresting shock so imparted to the instrument may cause the weight 52 to descend by compression of the spring 54 with closure of the circuit through the pendulum. Following such shock, the clockwork mechanism may operate and the weight may slowly move upwardly without, however, reaching its uppermost position before the instrument reaches its final location in the drill stem. Nevertheless, due to the fact that the instrument is in motion continuously, no record will be made, and if, when the instrument reaches its final position, the weight 52 is in some mid-position, this will not be at all material inasmuch as the final shock occurring when the instrument comes to rest will cause the weight to move fully downwardly so that the final timing action will have the same period as if the intermediate action due to shock had not occurred. In brief, the operator of the instrument will know that, irrespective of conditions encountered during the fall, the time elapsing between the instrument's coming to rest and the opening of the electrical circuit will be essentially the same so that he will know when it will be permissible to permit the instrument to rest without having made any objectionable undesired record upon the disc 20.

While the timing device has been illustrated as applied to the Ring type of instrument, it will be obvious that it is of general application to break electrical circuits or otherwise interrupt recording action of other types of well surveying instruments, for example, such instruments as utilize one or more lamps for photographic recording, and particularly instruments which, like the Ring instrument, depend upon a slow recording action for the production of records independent of timing means of conventional clockwork type adapted to be pre-set for time at the surface. Such an instrument, for example, is illustrated in an application of Smith, Ser. No. 399,085, filed June 21, 1941.

What I claim is:

1. A well surveying instrument comprising means for supporting a record member, electrically operating means for recording position of the instrument on said record member, and means for interrupting the recording action after a predetermined time interval following arresting of the instrument at its recording position comprising a weight, a spring supporting said weight, and a clockwork mechanism operated by the spring following strain thereof by the inertia of the weight when the instrument is arrested at its recording position.

2. A well surveying instrument comprising means for supporting a record member, electrically operating means for recording position of the instrument on said record member, and means for interrupting the recording action after a predetermined time interval following arresting of the instrument at its recording position comprising a weight, means yieldingly supporting said weight and timing means operated by said yielding supporting means following displacement of the supporting means by the inertia of the weight when the instrument is arrested at its recording position.

ROLAND RING.

(References on following page)

REFERENCES CITED

The following references are of record in the file of this patent:

UNITED STATES PATENTS

| Number | Name | Date |
|---|---|---|
| 1,630,694 | Dixon | May 31, 1927 |
| 1,788,729 | Meier | Jan. 13, 1931 |
| 1,808,691 | Stringer | June 2, 1931 |
| 1,928,644 | Bunker et al. | Oct. 3, 1933 |
| 1,938,872 | Stone et al. | Dec. 12, 1933 |
| 1,977,630 | Hester | Oct. 23, 1934 |
| 2,076,610 | Anderson | Apr. 13, 1937 |
| 2,152,671 | Smith | Apr. 4, 1939 |
| 2,219,512 | Cooper et al. | Oct. 9, 1940 |
| 2,246,319 | Ring | June 17, 1941 |
| 2,255,721 | Mattingly et al. | Sept. 9, 1941 |
| 2,412,976 | Emerson et al. | Dec. 24, 1946 |